Figure 1:
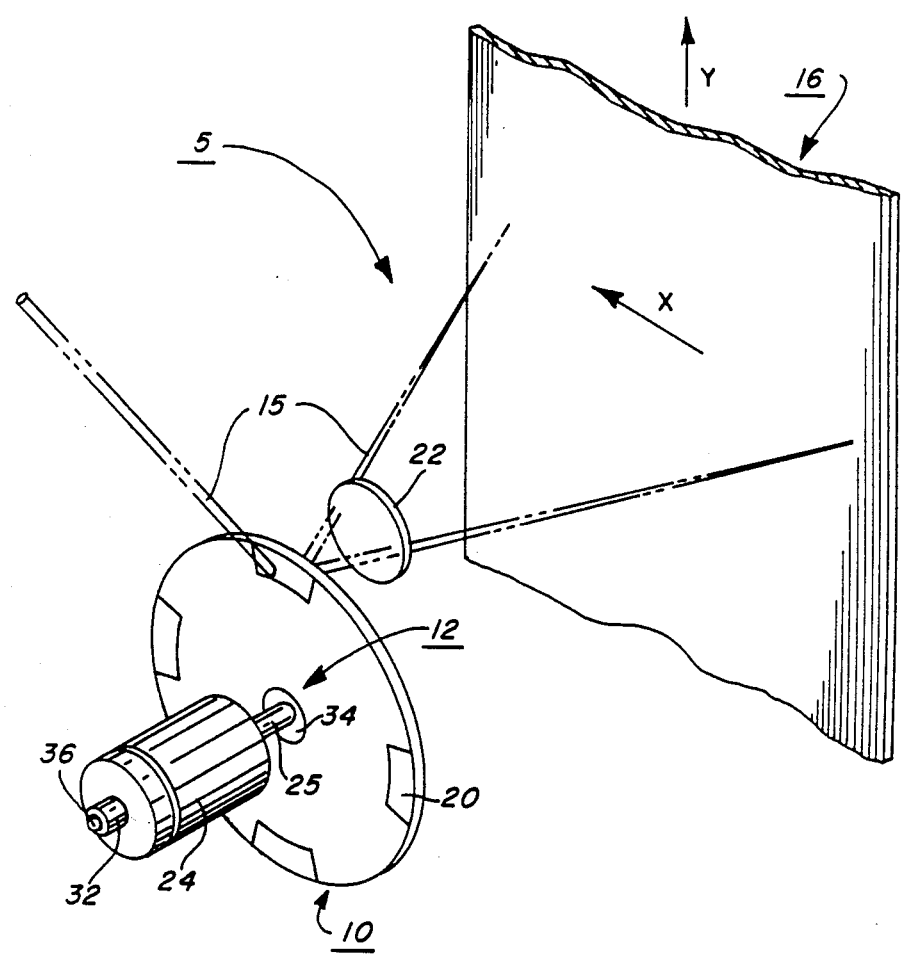

United States Patent [19]

Schell

[11] Patent Number: 4,556,278
[45] Date of Patent: Dec. 3, 1985

[54] HOLOGRAPHIC DISC MOUNT
[75] Inventor: Richard P. Schell, Ontario, N.Y.
[73] Assignee: Xerox Corporation, Stamford, Conn.
[21] Appl. No.: 582,107
[22] Filed: Feb. 21, 1984
[51] Int. Cl.⁴ .............................................. G02B 5/32
[52] U.S. Cl. .................................... 350/3.71; 250/236;
308/DIG. 15; 350/6.2; 350/6.7; 384/535
[58] Field of Search .................. 250/236; 308/184 A,
308/191, 194, DIG. 15; 350/3.70, 3.71, 6.2, 6.3,
6.9, 245, 247, 252, 631, 632, 633, 634, 636

[56] References Cited

U.S. PATENT DOCUMENTS 3,824,000 7/1974 Burns .................................. 350/245
4,353,615 10/1982 Kramer et al. ...................... 350/3.71

Primary Examiner—John K. Corbin
Assistant Examiner—William Propp
Attorney, Agent, or Firm—Frederick E. McMullen

[57] ABSTRACT

A free floating mount for the holographic disc of a scanner which enables centrifugal force developed by rotation of the disc to bring the disc into perpendicular relationship with the axis of the disc motor shaft and prevent disc wobble, comprising, a first self aligning couple composed of a pin and socket for supporting the disc on the end of the motor shaft, the shaft and disc having coaxial bores therethrough; a tensioning cable assembly extending through the motor shaft and disc bores, one cable segment of the cable assembly being attached to a retaining ball receivable in a socket in the disc, the retaining ball and socket forming a second self aligning coupling; a second cable segment at the opposite end of the cable assembly having a retaining ball attached thereto receivable in a socket in the motor shaft end and forming a third self aligning coupling; an extension spring interconnecting the first and second cable segments to form the cable assembly whereby the motor shaft and disc are biased through the second and third self aligning couplings into engagement through the first self aligning coupling to drivingly mount the disc on the motor shaft.

8 Claims, 2 Drawing Figures

HOLOGRAPHIC DISC MOUNT

The invention relates to scanners of the type employing a spinning disc-like element for scanning a beam across an object, and more particularly, to an improved mounting for such spinning element.

Many present day scanners utilize a polygon mirror to scan a beam across an object, such as a recording member. However, cross scan error, which is a function of polygon wobble or displacement during spinning or rotation of the polygon, must be held to the minumum level possible if desirable image quality and component life is to be achieved. For this purpose, the polygon is typically hard mounted on the polygon drive motor shaft and, to reduce wobble to the minimum level possible, the motor shaft is finished by centerless grinding. To compensate for any residual wobble as well as to correct for any facet to facet non-uniformities in the polygon, an anamorphic optical system is also used.

Using a holographic disc or hologon in place of a polygon eliminates the need and expense of using an anamorphic optical system; this due to the fact that a hologon has plane diffraction grating facets instead of mirrored surfaces, and therefore the polygon type facet to facet non-uniformity no longer exists. However, the need to eliminate wobble in the spinning holographic disc is still there.

While a holographic disc has an inherent self compensating tendency with respect to wobble, the degree to which this occurs is minimal. Further, the maximum self compensation for any wobble occurs only at equal angle conditions, with the 45° incident angle being optimum. Any slight deviation from this optimum angle results in a much lower wobble compensation factor and this is why disc wobble, which normally deviates from the optimum angle, remains a critical factor in the performance of hologon scanners.

It is understood that minimum disc wobble can be achieved by allowing the spinning disc to free float. By doing so, the centrifugal forces acting on the disc will cause the disc to align itself perpendicular to the axis of rotation. However, achieving a free floating disc mounting which takes advantage of this tendency and provides minimum disc wobble, yet which has the advantages of cost, ease of manufacturing, and consistency required for commercial success has proved to be a difficult if not impossible task.

The invention provides a free floating mount for supporting a scanner holographic disc on a motor shaft which takes maximum advantage of the self compensating tendency of the disc to bring itself into perpendicular relationship with the shaft axis and eliminate wobble, comprising: first self aligning coupling means for supporting the disc at one end of the motor shaft; cable means passing through coaxial bores in the disc and the motor shaft, the cable means having first and second cables connected end to end by bias means; second self aligning coupling means for connecting one end of the first cable with the disc; third self aligning coupling means for connecting the end of the second cable with the motor shaft; the bias means cooperating with the first and second cables to cause the second and third coupling means to draw the disc and shaft into frictional driving contact with one another through the first coupling means while permitting centrifugal force generated during rotation of the disc to adjust the angular relationship between the disc and the motor shaft as required to prevent disc wobble and maintain the plane of rotation of the disc perpendicular to the axis of rotation of the shaft while maintaining frictional driving contact therebetween.

IN THE DRAWINGS

Figure 2:
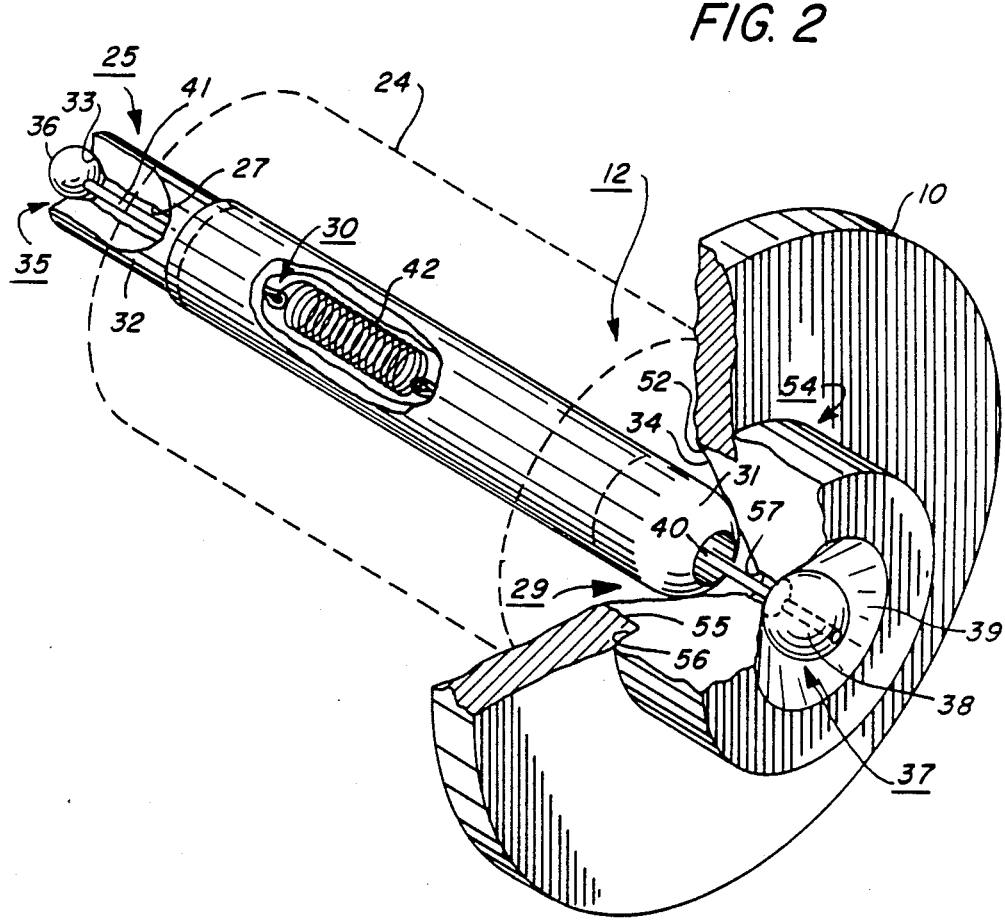

FIG. 1 is an isometric view depicting a holographic disc scanner of the type adapted to utilize the floating mount of the present invention; and FIG. 2 is an enlarged isometric view showing details of the floating mount of the present invention.

Referring to FIG. 1 of the drawings, there is shown an exemplary scanner, designated generally by the numeral 5, of the type incorporating a holographic scanning disc or spinner 10. As will appear, disc 10 is supported for rotation by the floating mount 12 of the present invention.

As will be understood by those skilled in the art, scanners such as scanner 5 function to repeatedly sweep a beam 15 of high intensity light, which is typically derived from a laser, across the object 16 to be scanned. Beam 15 is swept in a direction parallel to the scan line, i.e. in the X or fast scan direction shown by the solid line arrow. Concurrent movement of the scanned object 16 in a direction normal to the scan line, i.e. in the Y or slow scan direction shown by the dotted line arrow, provides the necessary line by line movement.

The scanned object 16, where scanner 5 comprises a raster output type scanner (ROS), typically comprises the recording member of an image reproducing system such as the photoconductive member of a xerographic type image reproducing system. In ROS scanning systems, a beam modulator such as an acousto optic modulator (not shown) is interposed in the path of beam 15 to modulate beam 15 in accordance with an image signal input as the beam is swept across the recording member. Exposure of the previously readied recording member by the modulated beam creates a latent image representative of the image signals on the recording member. The latent image typically is developed and transferred to an appropriate copy substrate such as paper.

Where scanner 5 comprises a raster input type scanner (RIS), scanned object 16 normally comprises an image bearing original. Typically, the original is supported upon a transparent platen to permit scanning, with a suitable driving mechanism provided to create the necessary relative movement between the scanning beam and the original in the slow scan direction (i.e. the direction shown by the dotted line arrow). In RIS type scanners, suitable photosensitive pickup means such as a photodiode (not shown) is provided to detect light reflections as the scanning beam is swept across the original and convert the light reflections to electrical signals representative of the image. Where the scanner 5 comprises a RIS type scanner, beam 15 is unmodulated.

Holographic disc 10 comprises a round plate-like element formed for example from glass having a succession of discrete light refracting segments or facets 20 around the circumference thereof adjacent the outer edge. Facets 20, which may be created through chemical deposition processes, cause the beam of light passing through the facet to bend or deflect. Concurrent rotation of the spinner changes the angle of incidence of the beam 15 on the facet with the result that the exit angle of the deflected beam progressively changes to in effect cause the beam 15 to be swept through an arc and across the scanned object 16. Suitable optical elements such as lens 22 are provided to guide and focus the beam exiting from spinner 10 to a spot on the scanned object 16. A suitable motor 24 is drivingly coupled to spinner 10 through floating mount 12 as will appear more fully hereinbelow.

Referring now particularly to FIG. 2 of the drawings, shaft 25 of motor 24 has an axial bore 27 therethrough within which the tensioning cable assembly 30 of floating mount 12 is disposed as will appear more fully. The end 31 of shaft 25 is spherical or cone shaped and forms one part of a self aligning coupling 29. The opposite end 32 has a cone-shaped recess 33 which forms a seat for retaining ball 36 of cable assembly 30, recess 33 and ball 36 cooperating to form a second self-aligning coupling 35.

Cable assembly 30 comprises first and second cable segments 40, 41 coupled together by extension spring 42. Retaining ball 36, which cooperates with recess 33 in shaft 25 to form self aligning coupling 35, is attached to the free end of cable segment 41.

Disc 10 has a circular, coaxial cutout 52 therein. A circular insert 54, which is preferably made from a suitable plastic material such as acetal is fitted within cutout 52 of disc 10, the diameter of the fitted section 55 of insert 54 received in cutout 52 being reduced to provide a locating stop 56. Preferably the outer diameter of insert section 55 is equal to or slightly greater than the inner diameter of cutout 52 to insure a tight fit on assembly of floating mount 12. Insert 54 has an axial bore 57 therethrough to accommodate cable assembly 30.

The inside wall of insert 54 facing motor 24 is provided with a cone shaped recess 34 coaxial with bore 57 within which the cone-shaped end 31 of shaft 25 is seated to provide self-aligning coupling 29 on assembly of disc 10 with the motor shaft 25. The outside wall of insert 54 is similarly provided with a cone shaped recess 39 coaxial with bore 57 for receipt of retaining ball 38 of cable assembly 30, ball 38 being attached to the free end of cable section 40 on assembly of the floating mount 12. Retaining ball 38 and recess 39 cooperate to form a third self-aligning coupling 37. The overall dimensions of self aligning couplings 35, 37 are preferably less than that of self aligning coupling 29.

The interior diameter of bore 27 in shaft 25 and bore 57 in insert 54 are somewhat larger than the outer diameter of cable assembly 30 to facilitate assembly and permit cable assembly 30 to move freely back and forth within the assembly.

Holographic disc 10 is assembled with drive motor 24 through floating mount 12 by press fitting the reduced section 55 of insert 54 into disc cutout 52 to a depth determined by locating stop 56. Cable assembly 30, having retaining ball 38 secured to the end of cable segment 40, is threaded through bore 57 in insert 54 and bore 27 in shaft 25 in succession. The free end of segment 41 of cable assembly 30 is pulled forward against the bias imposed by extension spring 42, and retaining ball 36 is secured thereto to complete the assembly. On release of the cable assembly 30, the bias imposed by spring 42 foreshortens the cable assembly to draw insert 54 and the disc 10 attached thereto, through the self-aligning couplings 35, 37, into operating assembly with motor shaft 25 via the self-aligning coupling 29.

When scanner 5 is first assembled, disc 10 is permitted to assume whatever angular relationship that the gravity forces acting on the assembly dictate. On actuation of scanner 5 and startup of motor 24 and rotation of shaft 25, disc 10, by virtue of the frictional contact between the cone shaped end 31 of shaft 25 and the cone shaped recess 34 of insert 54 imposed by extension spring 42 of cable assembly 30, rotates. As the speed of rotation of disc 10 increases, centrifugal force acting on disc 10 tend to cause the disc to rotate in a plane normal to the axis of shaft 25. Due to the action of centrifugal force, where wobble is present in disc 10 due to misalignment between the plane of rotation of disc 10 and the axis of shaft 25, disc 10 in effect pivots about the center of the cone-shaped end 31 of shaft 25, the centrifugal force developed due to the rotation of disc 10 being sufficient to pivot the disc 10 despite the frictional driving force imposed by extension spring 42.

Thereafter, on stopping of motor 24, disc 10, due to the bias imposed by extension spring 42, ordinarily remains in the aligned position unless disturbed by some extraneous force. Where disc 10 becomes misaligned, subsequent startup of motor 24 and rotation of disc 10 returns disc 10 to alignment in the manner described.

It will be understood by those skilled in the art that spring 42 is selected to provide a bias commensurate with the operating rpm at which disc 10 is intended to operate to offset dynamic effects on the disc such as due to windage.

While self aligning coupling 29 is illustrated and described herein as a cone and socket type coupling, a ball and socket type coupling may instead by envisioned. And while spring 42 has been shown and described as an extension spring, spring 42 may instead comprise a compression spring. In that event, the cable assembly 30 may be envisioned as a single cable of predetermined length having retaining ball 38 coupled to one end to form, in cooperation with recess 39, self-aligning coupling 37 as described heretofore. Self-aligning coupling 35 as the opposite end 32 of motor shaft 25 is replaced by an end cap slideably fitted over end 32 of shaft 25 and to which the free end of the cable secured. The compression spring chosen to provide a predetermined bias may be disposed between shaft 25 and the end cap, shaft 25 being formed to provide a suitable internal seat for the spring. In this modification, the compression spring works through the end cap to place a predetermined bias on the cable to draw the component parts of the floating mount 12 together and drivingly attach the disc 10 on shaft 25 of motor 24.

While the invention has been described with reference to the structure disclosed, it is not confined to the details set forth, but is intended to cover such modifications or changes as may come within the scope of the following claims:

I claim:

1. A free floating mount for supporting a scanner holographic disc on a motor shaft which takes maximum advantage of the self compensating tendency of the disc to bring itself into perpendicular relationship with the shaft axis and eliminate wobble, comprising:
   (a) first self aligning coupling means for supporting said disc at one end of said motor shaft;
   (b) cable means passing through coaxial bores in said disc and said motor shaft, said cable means having first and second cables and bias means connecting said first and second cables together end to end;
   (c) second self aligning coupling means for connecting one end of said first cable with said disc; and
   (d) third self aligning coupling means for connecting one end of said second cable with said motor shaft; said bias means cooperating with said first and second cables to cause said second and third coupling means to draw said disc and said shaft into frictional driving contact with one another through said first coupling means while permitting centrifugal force generated during rotation of said disc to adjust the angular relationship between said disc and said motor shaft as required to prevent disc wobble and maintain the plane of rotation of said disc perpendicular to the axis of rotation of said shaft while maintaining frictional driving contact therebetween.

2. The free floating mount according to claim 1 in which said second and third coupling means comprises mating ball and socket elements.

3. The free floating mount according to claim 1 in which said first coupling means comprises a spherical bearing surface on said motor shaft end and cooperating conical recess in said disc for receiving said motor shaft bearing surface in mating relation.

4. Free floating self aligning means for mounting the holographic scanning disc of a scanner on a motor shaft, comprising:
   (a) a socket in the side of said disc facing said motor shaft, one end of said motor shaft being rounded and disposable in said recess whereby to support said disc on said motor shaft, said motor shaft and said disc having axial bores cooperating to form an uninterrupted passageway therewithin;
   (b) tensioning cable in said passageway;
   (c) a retaining ball at one end of said cable, a second socket in the side of said disc remote from said motor shaft, said second socket receiving said retaining ball on insertion of said cable through said bore; and
   (d) bias means coupled to said cable for exerting a tensioning force on said cable to draw said retaining ball into said socket and draw said motor shaft rounded end into said first recess and frictionally engage said disc with said motor shaft, said shaft rounded end and said first socket cooperating to form a self aligning coupling permitting centrifugal forces developed by rotation of said disc to pivot said disc about said shaft rounded end whereby to align said disc with said motor shaft and prevent said disc from wobbling.

5. The self-aligning means according to claim 4 including
   a second retaining ball at the opposite end of said cable; and
   a third socket in the end of said motor shaft opposite said one end for receiving said second retaining ball on assembly of said disc on said shaft.

6. In a flying spot scanning apparatus, the combination of:
   (a) a rotatable drive shaft;
   (b) a holographic disc having discrete diffraction gratings thereon for scanning said spot across a recording member;
   (c) first mating sphere and socket means for suppporting said disc on one end of said drive shaft;
   (d) a longitudinal passageway extending through said drive shaft and said disc;
   (e) a tensioning cable in said passageway;
   (f) second mating sphere and socket means coupling said disc with one end of said cable; and
   (g) means coupling the opposite end of said cable to said drive shaft, tension on said cable being transmitted through said second sphere and socket means to said disc to draw said disc into frictional driving contact with said drive shaft through said first sphere and socket means, said first sphere and socket means permitting centrifugal forces generated upon rotation of said disc to align said disc at right angles with the axis of said drive shaft to eliminate disc wobble.

7. The scanning apparatus according to claim 6 in which said coupling means comprises third mating sphere and socket means coupling said cable opposite end with said drive shaft.

8. The scanning apparatus according to claim 7 in which said cable comprises discrete first and second cable sections, and
   spring means coupling said first and second cable sections together.

* * * * *